United States Patent [19]

Suzuki et al.

[11] Patent Number: 5,065,446
[45] Date of Patent: Nov. 12, 1991

[54] IMAGE DATA CODING APPARATUS

[75] Inventors: Yoshiyuki Suzuki, Kawasaki; Masahiro Funada, Yokohama; Mamoru Sato, Tokyo; Yukio Sato, Kawasaki, all of Japan

[73] Assignee: Canon Kabushiki Kaisha, Tokyo, Japan

[21] Appl. No.: 201,164

[22] Filed: Jun. 2, 1988

Related U.S. Application Data

[62] Division of Ser. No. 940,421, Dec. 11, 1986, Pat. No. 4,797,945.

[30] Foreign Application Priority Data

Dec. 13, 1985 [JP] Japan ................ 60-281630
Dec. 13, 1985 [JP] Japan ................ 60-281640
Dec. 13, 1985 [JP] Japan ................ 60-281641

[51] Int. Cl.$^5$ .................................. G06K 9/36
[52] U.S. Cl. ................................ 382/56; 382/46; 358/433
[58] Field of Search ............... 382/56, 21, 54, 46; 358/260, 263, 261.3, 433

[56] References Cited

U.S. PATENT DOCUMENTS

| | | | |
|---|---|---|---|
| 4,672,462 | 6/1987 | Yamada | 382/45 |
| 4,677,479 | 6/1987 | Watori et al. | 358/260 |
| 4,691,329 | 9/1987 | Juri et al. | 382/56 |
| 4,698,689 | 10/1987 | Tzon | 382/56 |
| 4,729,127 | 3/1988 | Chan et al. | 382/21 |
| 4,736,442 | 4/1988 | Kornfeld | 382/46 |
| 4,813,078 | 3/1989 | Fujiwara et al. | 382/21 |
| 4,922,545 | 5/1990 | Endoh et al. | 382/34 |

Primary Examiner—David K. Moore
Assistant Examiner—Yon Jung
Attorney, Agent, or Firm—Fitzpatrick, Cella, Harper & Scinto

[57] ABSTRACT

An image data coding apparatus adopting the method of this invention includes a divider section for dividing an image having gray levels into a plurality of blocks, each consisting of a plurality of pixels; a pre-processing section for detecting the density and the presence/absence of an edge in an image of each divided block; and a vector quantizing section for encoding an image of each block in accordance with the detected density and the presence/absence of the edge in the image of the block. The pre-processing section detects a standard deviation of density levels of the pixels included in each block. The vector quantizing section divides the density levels of the pixels included in each block into a plurality of level sections so as to obtain a code indicating the level section in which the density level of each pixel is included. In the vector quantizing section, the obtained code is again encoded by means of vector quantization.

8 Claims, 13 Drawing Sheets $x_i - m = s_i$   $s_i/\sigma = n_i, n_i = 0,1,2,3$ $\sum x_i/16 = m$   $(\sum s_i^2/16)^{1/2} = \sigma$

| m | $b_L$ | $b_{01}$ | $b_A$ | $b_{12}$ | $b_B$ | $b_{23}$ | $b_U$ |
|---|---|---|---|---|---|---|---|
| ~ 32 | -0.4 | 0.1 | 0.5 | 1.0 | 1.5 | 1.9 | 2.4 |
| ~ 64 | -0.6 | -0.1 | 0.3 | 0.7 | 1.1 | 1.5 | 2.0 |
| ~ 96 | -0.9 | -0.5 | 0.1 | 0.4 | 0.8 | 1.2 | 1.6 |
| ~ 128 | -1.2 | -0.8 | -0.4 | 0.0 | 0.4 | 0.8 | 1.2 |
| ~ 160 | -1.5 | -1.1 | -0.7 | -0.3 | 0.1 | 0.5 | 0.9 |
| ~ 192 | -1.9 | -1.5 | -1.1 | -0.6 | -0.1 | 0.3 | 0.7 |
| ~ 224 | -2.4 | -1.9 | -1.4 | -1.0 | -0.5 | 0.0 | 0.5 |
| ~ 255 | -2.6 | -2.1 | -1.6 | -1.1 | -0.7 | -0.2 | 0.3 |

SECTION DIVIDING ($\sigma > 20$)

| $b_L$ | $b_{01}$ | $b_0$ | $b_{12}$ | $b_U$ |
|---|---|---|---|---|
| -1.1 | -0.4 | 0.0 | 0.4 | 1.1 |

SECTION DIVIDING ($\sigma \leq 20$)

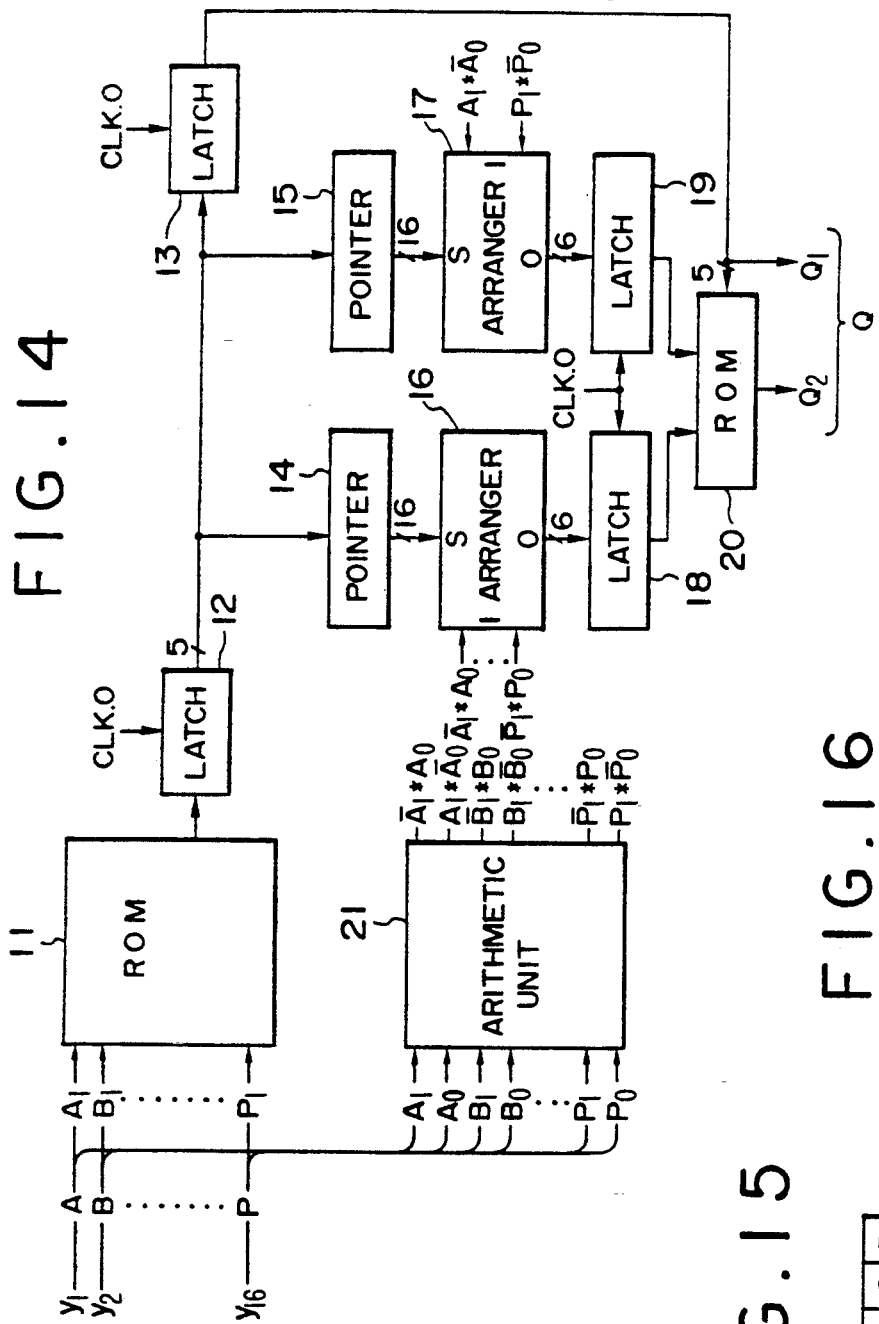
FIG. 14
FIG. 15
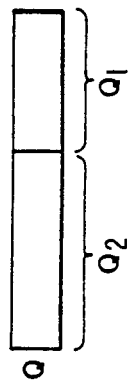
FIG. 16

IMAGE DATA CODING APPARATUS

This is a division of application Ser. No. 940,421, filed Dec. 11, 1986 now U.S. Pat No. 4,797,945.

BACKGROUND OF THE INVENTION

1. Field of the Invention

The present invention relates to a coding apparatus for encoding digital image data and, more particularly, to a coding apparatus which can encode image data representing gray levels with high efficiency.

2. Related Background Art

In an image transmission apparatus such as a facsimile system, or an image memory apparatus such as an electronic filing system, coding processing for compressing image data is performed in order to improve transmission and storage efficiencies. In such coding processing, the Modified Huffman (MH) coding method, the Modified Read (MR) coding method, or the like is normally used. These coding methods are mostly used for white/black binary image data, and a coding operation with high compression efficiency can be performed with respect to binary data including no halftone data, such as a document.

However, when a coding method for the white/black binary image data is used for encoding image data representing a halftone image, e.g., a photograph, a coding operation with high compression efficiency cannot often be made. In some cases, the data volume after encoding often exceeds the original data volume.

Therefore, in order to achieve a high compression ratio, the data volume to be encoded may be decreased at the cost of halftone reproducibility. However, with this method, a distortion occurs between a reproduced image and an original image, and this method is not preferable.

Various other high-efficiency methods have been proposed for digital image data with gradation on the basis of an idea quite different from the conventional coding methods for white/black binary data. In some of these methods, an input image is divided into N×M blocks, and a coding operation is performed for each block. In one of such methods, an average value (DC component) of pixel levels in each block is calculated, differences (AC components) from the average value are extracted, and the differences are encoded. However, with this method, a high compression ratio cannot be obtained. When the compression ratio is to be improved, reproduced image quality may be degraded. Therefore, this method is not suitable for an image with gradation.

SUMMARY OF THE INVENTION

The present invention has been made in consideration of the above situation and has as its object to provide a coding method and apparatus for image data with high compression efficiency.

It is another object of the present invention to provide a coding method and apparatus for image data, which can improve compression efficiency and can suppress an increase in distortion in a reproduced image.

It is still another object of the present invention to provide a coding method and apparatus for image data, suitable for encoding of image data with gradation.

It is still another object of the present invention to provide a coding method and apparatus for image data, which can suppress distortion in an input having a high contrast including, e.g., an edge, to achieve a high-quality reproduced image.

It is still another object of the present invention to provide a coding method and apparatus for image data, which can perform high-speed coding processing with a simple circuit configuration.

The above and other objects, features and advantages of the present invention will be apparent from the following description.

BRIEF DESCRIPTION OF THE DRAWINGS

FIG. 14 is a circuit diagram for executing the operation shown in FIG. 13;

FIG. 15 is a view showing pixels in blocks;

FIG. 16 is a format of an encoding code;

DETAILED DESCRIPTION OF THE PREFERRED EMBODIMENTS

A preferred embodiment of the present invention will now be described hereinafter in detail.

According to the basic principle of the present invention, an image to be encoded is divided into blocks having a predetermined size, the feature of each block is discriminated in accordance with the average value and standard deviation of the block, and encoding corresponding to each block is performed in accordance with the discrimination result.

Figure 1:
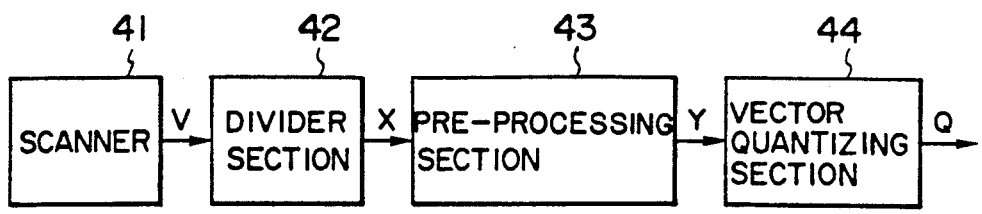
FIG. 1 is a diagram showing a basic arrangement of an image data coding apparatus employing the present invention.

FIG. 1 shows the basic arrangement of an image coding apparatus to which the present invention is applied. A scanner 41 optically scans an original on which an image to be encoded is formed, by means of a CCD image sensor, or the like, and outputs image data V representing an original image. A divider section 42 inputs the image data V output from the scanner 41, and divides the data V into blocks each having a predetermined size consisting of a plurality of pixels (e.g., 4×4). A pre-processing section 43 calculates an average value and standard deviation of pixel data included in each block output from the divider section 42, thereby performing pre-processing for vector quantization. A vector quantizing section 44 quantizes data in each block pre-processed by the pre-processing section 43.

The divider section 42, the pre-processing section 43, and the vector quantizing section 44 shown in FIG. 1 will be described hereinafter in detail. (Divider Section)

Figure 2:
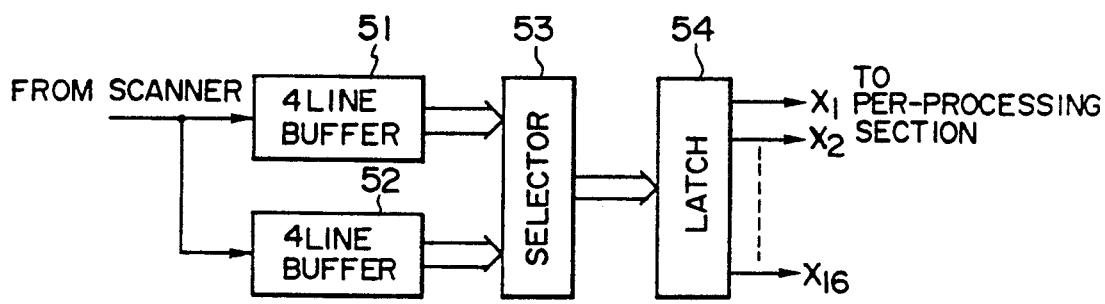
FIG. 2 is a diagram showing an arrangement of a divider section shown in FIG. 1.

FIG. 2 shows the arrangement of the divider section 42 shown in FIG. 1. The scanner 41 shown in FIG. 1 serially outputs image data for one line. 4-line buffers 51 and 52 respectively store image data for four lines output from the scanner 41, and each comprise semiconductor random-access memories. The line buffers 51 and 52 have a so-called double line buffer arrangement, so that image data write access is performed for one line buffer, while the other line buffer is subjected to image data read access.

Figure 3:
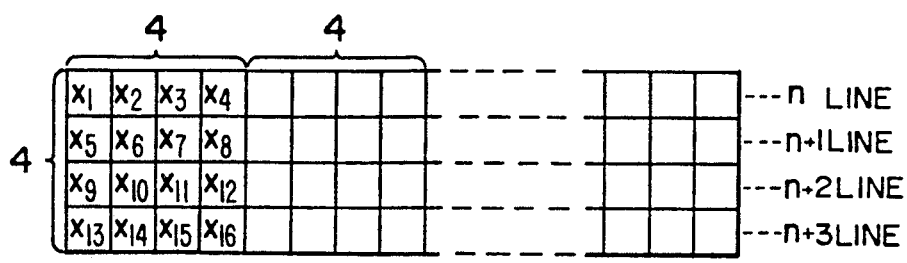
FIG. 3 is a format showing image data stored in a line buffer.

FIG. 3 shows image data stored in the 4-line buffers. As shown in FIG. 3, image data for four succeeding lines (nth to (n+3)th lines) are stored in each 4-line buffer. In this state, image data for four pixels are sequentially derived from each line, thereby outputting image data (x1 to x16) for 16 pixels which constitute a block of a predetermined size (4×4).

A selector 53 selects either of the outputs from the line buffers 51 and 52. The 16-pixel image data selected by the selector 53 is temporarily latched by a latch 54. The latch 54 outputs image data x1 to x16 in synchronism with the operation of the pre-processing section 43 connected to the outputs of the latch 54.

Quantizing Section

Figure 4:
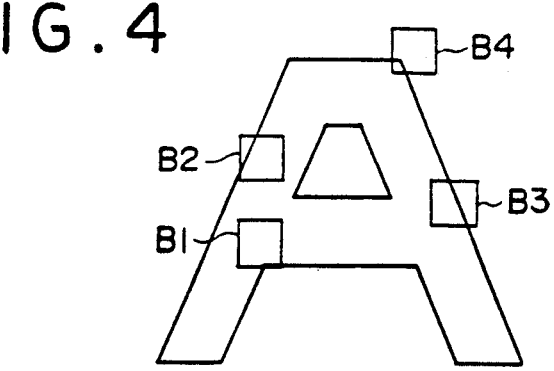
FIG. 4 is an illustration showing an image to be encoded.

FIG. 4 is for explaining the principle of image encoding of the present invention. In this case, a case will be explained wherein an image representing the letter "A" is to be encoded.

It is discriminated from the standard deviation of density signals in each block whether a block of a predetermined size includes an edge. More specifically, a block having a small standard deviation is determined to correspond to a low-contrast area, and one having a large standard deviation is determined to include an edge.

Figure 5A:
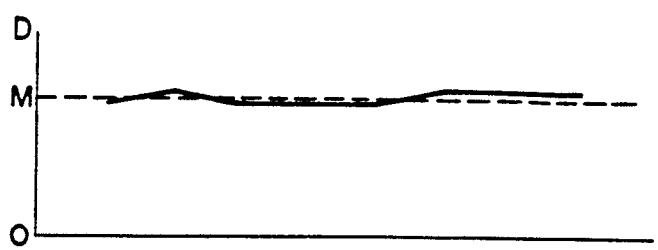
FIGS. 5a to 5d are charts showing pixel levels of blocks.

Referring to FIG. 4, a block B1 is entirely included in a line constituting letter "A", and its density signals D exhibit a small standard deviation, as shown in. FIG. 5a. Although a block included in a background portion or a block of a low-contrast image, such as a photograph, exhibits a similar tendency to the above, such a block has a different average value M.

Figure 5B:
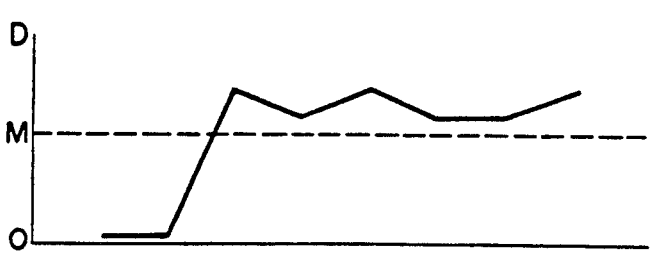
Figure 5C:
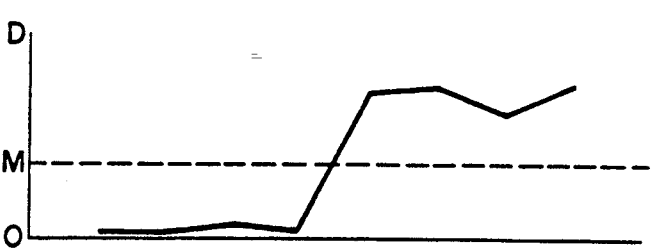
Figure 5D:
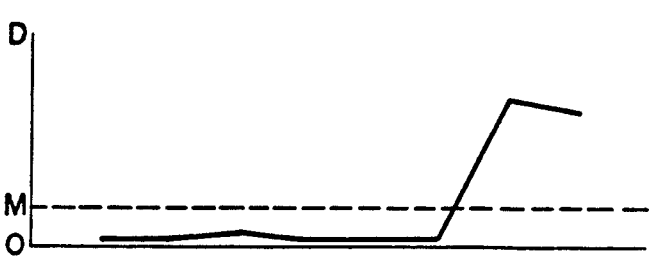

Blocks B2 to B4 include boundaries, i.e., edges, of the letter "A", and their density signals D exhibit large standard deviations, as shown in FIGS. 5b to 5d. However, the average values M of blocks B2 to B4 are different from each other in accordance with overlapping states (degrees of overlap) of the blocks on the edges. More specifically, when a block overlaps a line (edge) over a long distance like the block B2, since this block includes more pixels of high density, it exhibits a large average value M. Conversely, when a block includes a large background portion like the block B4, it exhibits a small average value M.

Thus, the blocks are classified in accordance with their standard deviations and average values, and a result obtained by subtracting the density signal in each block from the corresponding average value is divided by the standard deviation, thus obtaining a normalized difference for each class. The histograms of the normalized differences are as shown in FIG. 6, and each represents features of the respective classes.

Figure 6A:
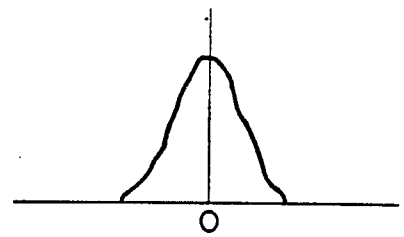
FIGS. 6a to 6d are histograms of blocks.
Figure 6B:
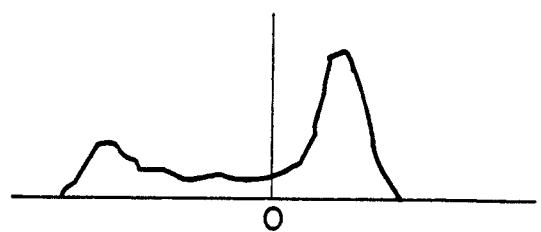
Figure 6C:
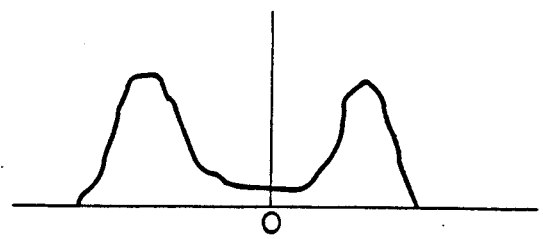
Figure 6D:
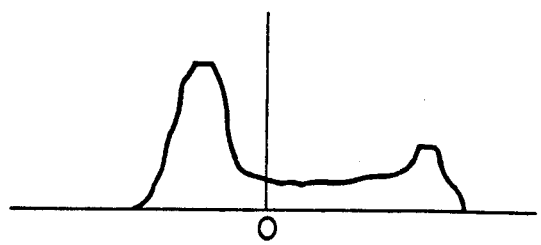

If a block has a small standard deviation like the block B1, its histogram represents a normal distribution having a difference 0 as its center, as shown in FIG. 6a. The histograms of the blocks B2 to B4 including edges have their peaks at differences corresponding to line portions and background portions, as shown in FIGS. 6b to 6d, and frequencies of intermediate differences therebetween are low. The peak difference and frequency vary in accordance with the average value, i.e., whether a larger portion of a block includes a line or background portion. More specifically, in the histogram of a block including a large line portion like the block B2 (FIG. 6b), a maximum peak value appears at a difference corresponding to the line portion, and a second peak value appears at a difference corresponding to the background portion. The maximum peak value appears at a small difference portion (0 to $1 \times \sigma$), and the second peak value appears at a large difference portion ($-1 \times \sigma$ to $-2 \times \sigma$).

The histogram of the block B4 including a large background portion (FIG. 6d) has a shape corresponding to the inverted histogram of the block B2 (FIG. 6b) about the difference 0. In the histogram of the block B3 equally including line and background portions (FIG. 6c), peak values respectively appear near $\pm 1 \times \sigma$.

The normalized differences are divided into sections in accordance with the shapes of the histograms, as shown in FIG. 6, and are coded as "0" to "3".

Figure 7:
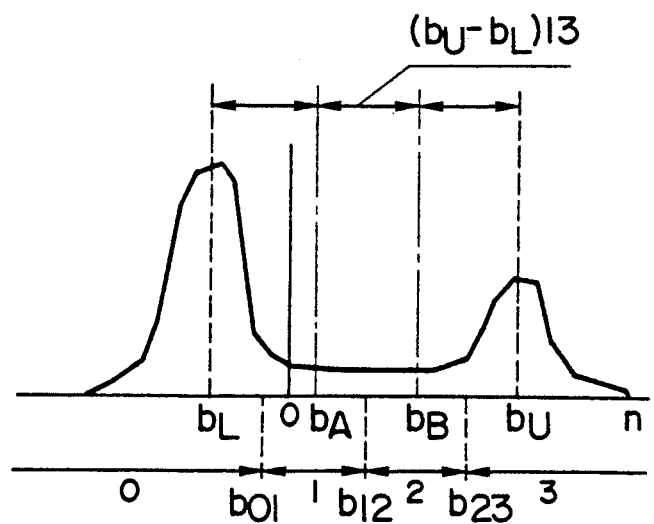
FIGS. 7 and 8 are charts showing correspondences of encoding codes.

As shown in FIG. 7, three-divisional points bA and bB of normalized differences bL and bU corresponding to two peak values of the histogram are obtained, and coding is performed with reference thereto. More specifically, of codes "0" to "3", a code corresponding to a section to which a normalized difference to be encoded belongs is output as a 2-bit encoding code If a normalized difference is given by ni, $ni \leq b01$ is encoded to be "0", $b01 < ni \leq b12$ is encoded to be "1", $B12 < ni \leq b23$ is encoded to be "2", and $b23 < ni$ is encoded to be "3". Note that parameters b for sections are respectively determined in accordance with the following formulas:

$$bA = bL + c$$

$$bB = bL + 2c$$

$$c = (bL + bU)/3$$

$$b01 = (bL + bA)/2$$

$$b12 = (bA + bB)/2$$

$$b23 = (bB + bU)/2$$

In the above formulas, bL and bU indicate normalized differences corresponding to two peak values in a histogram, and bL < bU. Decoding is performed with reference to representative points 0→bL, 1→bA, 2→bB, and 3→bU.

Figure 8:
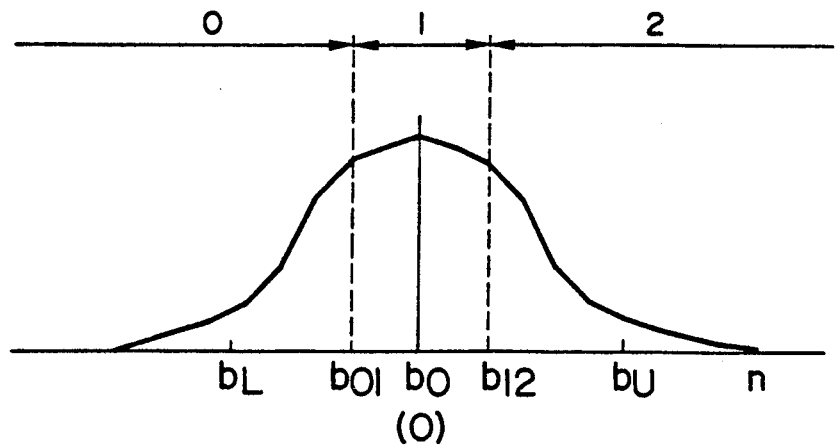

When a block having a small standard deviation is encoded, since its histogram can be approximated to a normal distribution or has a small influence on its reproduced image as described above, the block is divided into three blocks of "0" to "2". FIG. 8 exemplifies encoding of this case. Division points b01 and b12 in FIG. 8 are calculated using a statistical means. More specifically, if F(n) is a distribution function obtained from a corresponding histogram, points satisfying the following formulas are respectively given as b01 and b12:

$$F(n)=\tfrac{1}{3},\ F(n)=\tfrac{2}{3}$$

Representative points bL, bO, and bU of "0" to "2" are used as predicted values for the respective sections.

Figure 9:
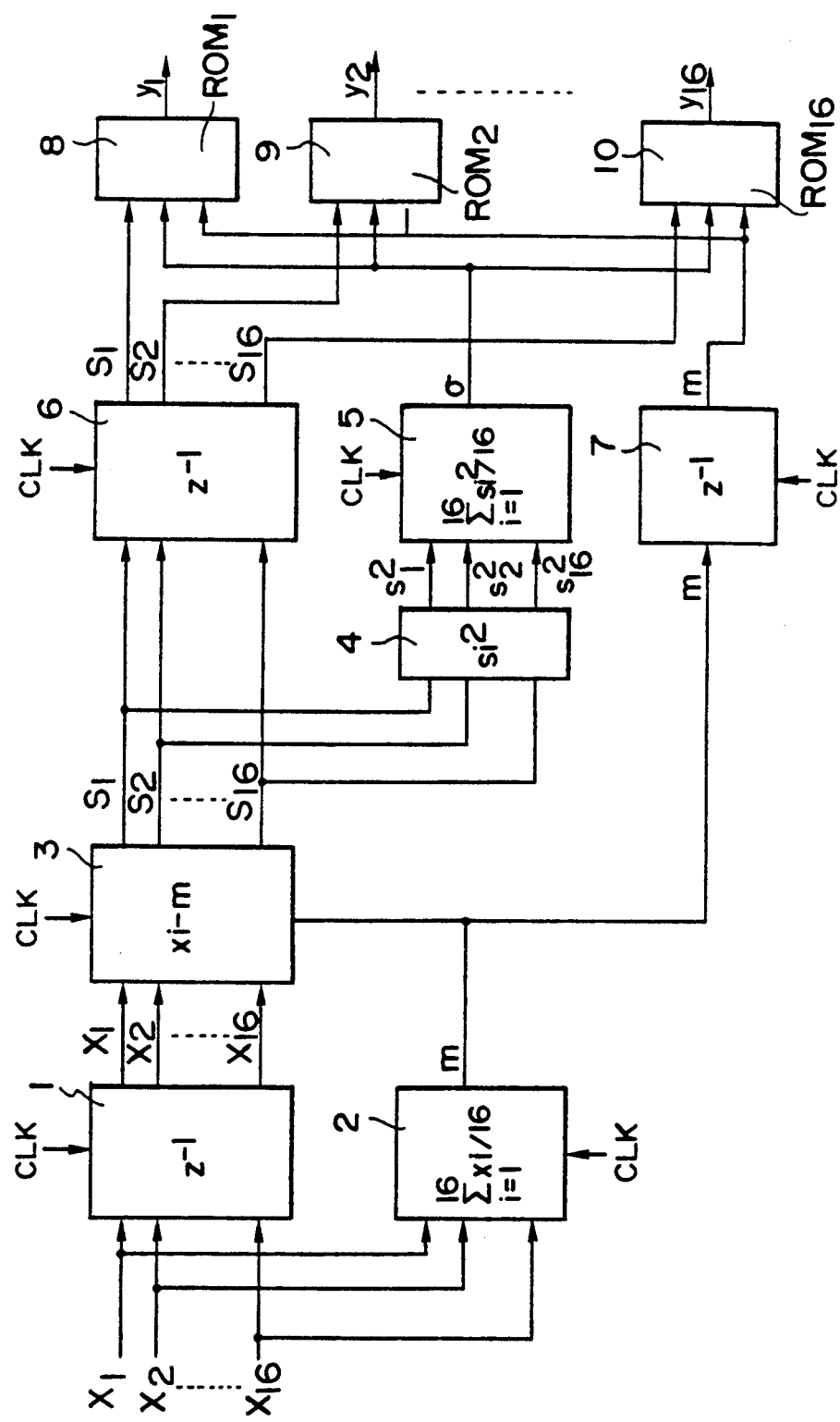
FIG. 9 is a block diagram showing the arrangement of a pre-processing section.
Figures 10, 11A, 11B:
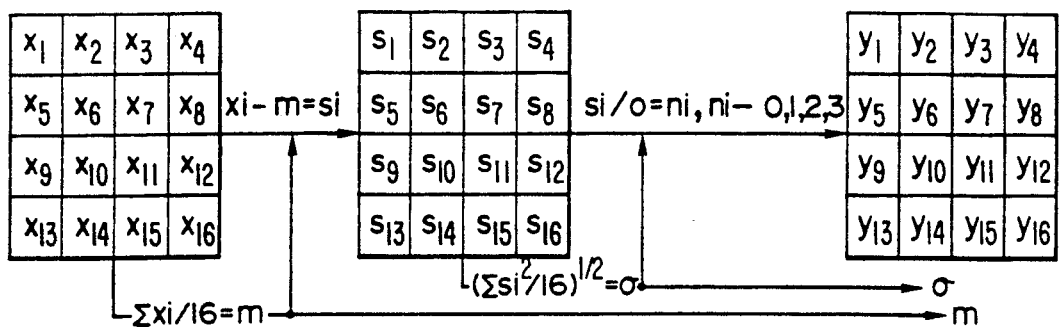
FIG. 10 is a chart for explaining the operation of the circuit shown in FIG. 9.
FIGS. 11a to 11b are formats showing encoding divisions.

FIG. 9 shows the detailed arrangement of the pre-processing section 43 shown in FIG. 1. FIG. 10 shows pixel processing in units of blocks with the arrangement shown in FIG. 9. In this embodiment, a block size corresponds to 16 (4×4) pixels.

Referring to FIG. 9, an average value m of pixel data x1 to x16 in each block is calculated by an average value calculator 2. The average value calculator 2 can be realized by an adder for adding data x1 to x16. The average value m is subjected to-subtraction with the respective image data by a subtractor 3, thus obtaining differences S1 to S16 of the respective pixels. A delay circuit 1 synchronizes the calculation output from the average value calculator 2 with the pixel data so as to delay pixel data x1 to x16 by one synchronous clock CLK.

In order to calculate a standard deviation $\sigma$, a multiplier 4 calculates square roots $S^2 1$ to $S^2 16$ of the differences S1 to S16. The multiplier 4 comprises a memory ROM having a table in which multiplication results are written. When an average value calculator 5 similar to the calculator 2 receives the square roots $S^2 1$ to $S^2 16$ from the multiplier 4, it calculates the average values of $S^2 1$ to $S^2 16$, and the average value is used as the standard deviation $\sigma$. Delay circuits 6 and 7 respectively delay the differences S1 to S16 from the subtractor 3 and the average value m from the calculator 2 by one clock to synchronize them with the output of the standard deviation $\sigma$.

Memories ROM 8 to ROM 10 prestore encoding tables corresponding to the differences S1 to S16, and receive the average value m from the delay circuit 7, the standard deviation $\sigma$ from the average value calculator 5, and the corresponding differences S1 to S16 from the delay circuit 6.

The memories ROM 8 to ROM 10 normalize the corresponding differences S1 to S16 with the standard deviation $\sigma$. In other words, the memories ROM 8 to ROM 10 divide the differences by the standard deviation, so as to encode the normalized differences ni into 2-bit codes "0" to "3" in accordance with the average value m and the standard deviation $\sigma$. The memories ROM 8 to ROM 10 prestore encoding tables for outputting encoded codes y1 to y16 corresponding to the input signals. FIG. 11 exemplifies this encoding operation. In FIG. 11, assume that input pixel data xi has 256 gray levels of 0 to 255. FIG. 11a shows a case wherein the standard deviation $\sigma$ is larger than 20 and a block includes an edge. The parameter b for dividing a block into sections is determined in accordance with the average value m. The input normalized difference ni is converted into 2-bit code yi in accordance with the corresponding parameter b. Note that the parameters are as defined in FIG. 7.

FIG. 11b shows a case wherein the standard deviation $\sigma$ is equal to or smaller than 20, and this block is determined to have a low contrast. In this case, the input normalized difference ni is uniquely encoded to be 2-bit code yi regardless of the average value m. The parameters in this table are defined in FIG. 8.

The series of processing are performed by memories $ROM_1$ 8 to $ROM_{16}$ 10 corresponding to the differences S1 to S16. The respective ROMs output 2-bit codes "0" to "3" using the differences S, the average value m, and the standard deviation $\sigma$ as their input addresses.

As described above, AC components (differences from an average value) obtained by separating a DC component (the average value) from pixels in each divided block are normalized by a parameter reflecting a contrast in the corresponding block (e.g., the standard deviation). The range of the normalized differences are divided into several sections in accordance with the separated DC component or feature parameter, and the identical code is assigned to pixels having given differences in the corresponding section to encode them. In contrast to this, during decoding, the representative value in the section is used as a reproduction value. Thus, a high compression ratio and a high-quality reproduced image can be obtained.

In the above embodiment, the feature parameter of a contrast in each divided block is discriminated by the standard deviation of pixel levels in the block. The discrimination of the feature parameter is not limited to this, but can be executed by other methods by calculating a difference between maximum and minimum pixel levels or a distribution state pixel levels in each block. The size of a block is not limited to 4×4 pixels, and the pixel levels are also not limited to 256 gray levels.

The encoded code is not limited to two bits. As the number of dividing sections is increased, the number of bits of the encoded code is also increased. As the number of sections is increased, the compression ratio is decreased.

As described above, digital image data is divided into a plurality of pixel blocks, and pixels in each block are encoded in accordance with an average value and a contrast of the block. Therefore, encoding operation with high compression ratio and no degradation in image quality can be executed with respect images having gradation.

Vector Quantizing Section

In order to further compress data pre-processed for each block by the pre-processing section 44, vector quantization is executed by the vector quantizing section 44 shown in FIG. 1.

Vector quantization is known as a high-efficiency encoding method for digital image data. In the vector quantization, an input image is divided into blocks of K pixels, and each block is defined as a K-dimensional Euclidean signal space. A K-dimensional input vector $x=\{x1, x2, \ldots, xk\}$ generated in this space is mapped to a reproduced vector $yi=\{yi1, yi2, \ldots, yik\} i=1, \ldots, N$, exhibiting a minimum distortion.

The vector quantization can realize high-efficiency encoding as compared to conventional scalar quantization. With the same compression ratio, a reproduced image has a higher quality.

Figure 12:
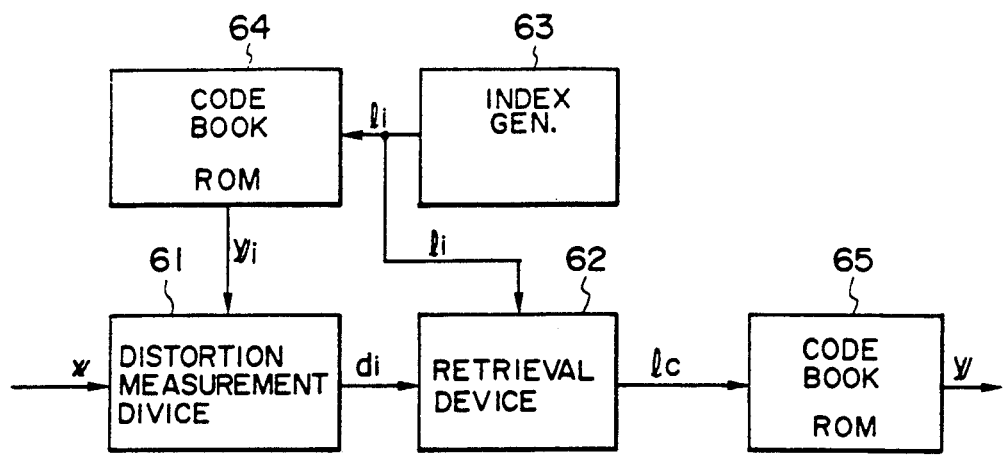
FIG. 12 is a block diagram of a vector quantizing section.

FIG. 12 shows the detailed arrangement of the vector quantizing section Referring to FIG. 12, reproduced vectors are prestored in code-book ROMs 64 and 65. Addresses supplied to the ROMs 64 and 65 are used as indices for the reproduced vectors.

In the case of encoding, an index Ii output from an index generator 62 is supplied as an address of the encoding code-book ROM 64. The reproduced vector yi is output as the output of the ROM 64, and a distortion with an input vector x to be encoded is calculated by a distortion measurement device 61, and is output as a distortion measure di.

As the distortion measure, $$di = \sum_{j=1}^{k} |xj - yij| \text{ or } di = \sqrt{\sum_{j=1}^{k} (xj - yij)^2}$$

is often used, and one suited for respective applications is selected. Note that the latter represents a known distance between x and yi.

The distortion measure di is stored in a retrieval device 62 together with the index Ii of the reproduced vector. After the calculation of the distortion measured di with all the reproduced vectors is completed, an index of a reproduced vector providing a minimum distortion is given as a code Ic. Thus, the input vector x is encoded In the case of decoding, the code Ic is input to an address of the decoding code-book ROM 65, and its output is used as the reproduced vector y.

However, in the encoding operation with this total retrieval method for retrieving all the reproduced vectors, a large volume of processing, e.g., calculation of the distortion measures, is required, and processing speed is low, resulting in disadvantages for practical applications.

In order to solve the above problem, a tree retrieval method is proposed wherein the feature of an input vector to be encoded is extracted, thereby decreasing a retrieval range stepwise. However, with this tree retrieval method, a reproduced vector providing a minimum distortion cannot often be retrieved, and distortion increases as compared to the total retrieval method.

According to the present invention, a vector quantizing section for digital image data, which can perform real-time vector quantization with a relatively simple hardware arrangement is proposed.

The basic principle of vector quantization in this embodiment will now be described.

An input pattern IP to be encoded which is divided into blocks of a predetermined size is binarized with an appropriate threshold value. For example, an average value of the input pattern is considered as the appropriate threshold value. However, the threshold value is not particularly limited to this. A binarized pattern in this manner is referred to as a white/black pattern SP. Vector quantization is performed using the white/black pattern SP as the input vector. In this vector quantization, a code book in which a plurality of types of white/black patterns are registered, is prepared, and is subjected to retrieval with reference to the white/black pattern SP.

A predetermined pixel for each white/black pattern SP obtained by the vector quantization is extracted from an original input pattern IP. These extracted pixels are combined to be a set, and are used as the input vector to again perform vector quantization. Note that pixel extraction is performed in accordance with a pre-determined pointer indicating a pixel of interest for each white/black pattern SP.

This aims at simplifying quantization, in such a manner that a schematic structure of an input pattern IP is extracted from a white/black pattern SP, and pixels other than a pixel of interest are used as fixed values to decrease the number of dimensions of the input pattern. A block of a pattern consisting of pixels of the reproduced vector and fixed values assigned as pixels of non-interest is assumed, and a final reproduced vector is obtained from the assumed pattern.

The above principle will be described in detail with reference to FIG. 13. In this case, an image to be encoded is an input pattern IP of a block size of 4×4 pixels, and each pixel included in this block has four 2-bit gray levels. 16 pixels included in this block are binarized so that pixels of levels "3" and "2" are encoded to be "1" (white) and pixels of levels "1" and "0" are encoded to be "0" (black), thus obtaining a white/black pattern SP.

Vector quantization is performed using the white/black pattern as the input vector to obtain a code Q1 of a reproduced vector. In this case, assume that the same white/black pattern as the white/black pattern SP obtained by binarizing the input pattern is registered in the code book.

Pixel-of-interest patterns CWP and CBP for indicating six pixels to be extracted for predetermined white and black pixels in association with the white/black pattern SP are read out, respectively. Six white or black pixels are extracted from the input pattern IP using the pixel pattern CWP or CBP as a mask pattern. Note that the pixel-of-interest patterns are set to include an edge portion between the white and black patterns taking reproduction of an image edge portion into consideration. Vector quantization is performed again using vectors WV and BV each consisting of the extracted 6 pixels to obtain a code Q2 of a reproduced vector.

Figure 13:
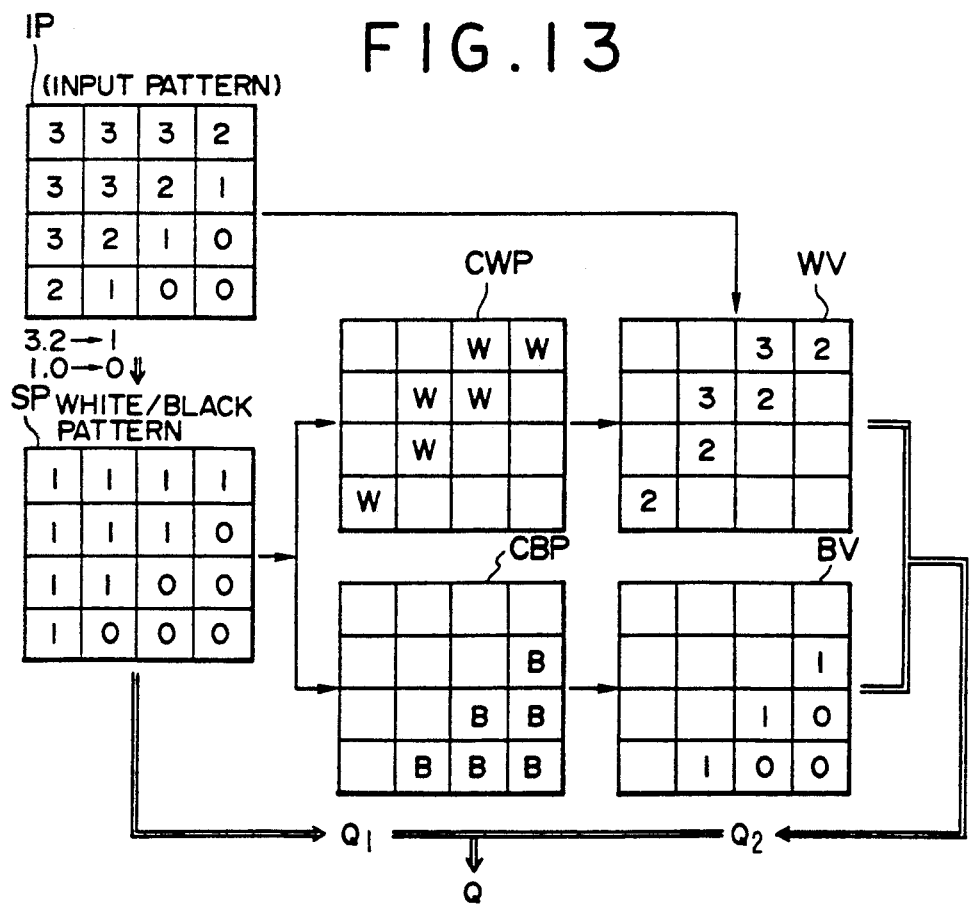
FIG. 13 is a chart for explaining the operation of the vector quantizing section.

In FIG. 13, since each pixel of the input pattern IP consists of 2 bits, the extracted pixel level is "0" or "1" for a black pixel or is "3" or "2" for a white pixel, and each extracted pixel can be considered as a one-bit component. Therefore, in this case, quantization is performed using the extracted 12 pixels as an input vector.

In the case of an input pattern having more gray-levels, quantization can be respectively performed for white and black pixels to obtain codes of the reproduced vectors. More specifically, the above arrangement and the number of pixels of interest are determined in accordance with a condition for designing hardware, e.g., the number of gray levels of an input pixel.

A code Q of a finally reproduced pattern is obtained from the codes Q1 and Q2 obtained as described above.

FIG. 14 shows the circuit configuration for performing the above-mentioned vector quantization using the coding apparatus shown in FIG. 1.

As described above, pre-processed data y1 to y16 for 16 pixels are input from the pre-processing section 43 for each 4×4 block. Data yi has four gray levels obtained by compressing image data having 256 gray levels using an average value and a standard deviation of the block. Therefore, an input pattern to the circuit shown in FIG. 14 is also divided into blocks for 16 pixels (4×4) in the same manner as in FIG. 13, and each pixel included in each block has four (2-bit) gray levels. As shown in FIGS. 15, 16 pixels are respectively labeled A to P, and each pixel level is represented with suffixes 1 and 0, such that the upper bit of two bits is given by A1, and the lower bit thereof is given by A0.

A white/black pattern is retrieved from an input pattern IP by a ROM 11 having a table of reproduced vectors. If the respective pixels are then binarized such that the pixel level "0" or "1" is binarized to be "0" and the pixel level "2" or "3" is binarized to be "1", as shown in FIG. 13, the binarized results correspond to upper bits A1 to P1 of the respective pixels A to P. Therefore, the bits A1 to P1 are supplied to the addresses of the ROM 11 as input vectors.

The ROM 11 stores a white/black pattern code providing a minimum distortion with respect to the input vectors A1 to P1. More specifically, the ROM 11 does not always store all the white/black patterns as reproduced patterns. In the ROM 11, the table is formed such that, of $2^{16}$ possible patterns of the input vectors A1 to P1, some of these are assigned to indentical codes, and $2^5$ patterns, i.e., 5-bit white/black pattern codes are output. In other words, a total of 32 white/black patterns are registered in the code book of the ROM 11.

The 5-bit code output from the ROM 11 is synchronized by synchronizing clocks CLK-O by a latch 12, and is then input to the addresses of a pointer 14 for indicating a black pixel of interest and a pointer 15 for indicating a white pixel of interest.

These pointers 14 and 15 comprise ROMs, and each ROM stores data for outputting "1" in correspondence with the pixel of interest and "0" in correspondence with other pixels, as described with reference to FIG. 13. In this embodiment, since one pattern has 16 pixels, the data stored in the ROMs of the points 14 and 15 corresponds to a 16-bit output. Six pixels are then extracted from each black or white area. Therefore, 16-bit data consisting of 6 bits of data "1" and the remaining 10 bits of data "0" is output from the pointer 14 or 15.

Pixel data is extracted from the input pattern IP in accordance with the outputs from the pointers 14 and 15. In this case, as described with reference to FIG. 13, the extracted pixel data is "0" or "1" in a black area or is "2" or "3" in a white area, and is processed as binary data. Therefore, the pixel data are subjected to a simple bit calculation by an arithmetic unit 21 to be converted to 1-bit input patterns. More specifically, a calculation is performed for all the pixels A to P so as to obtain, e.g., 1-bit data $\overline{A1}*A0$ (1→1; 0,2, 3→0) for a black input pattern and 1-bit data $A1*\overline{A0}$ (2→1; 0,1, 3→0) for a white input pattern in association with the pixel A.

In this manner, data for six pixels (6-bit data) are extracted, by arrangers 16 and 17 from the white and black patterns converted to the 1-bit data by the arithmetic unit 21, in accordance with the output from the pointers 14 and 15. The operation of the arrangers 16 and 17 will be described in detail with reference to the following example. The following example shows the operation for black pixels in FIG. 13, and a similar operation is performed for white pixels.

ing pixel labels H, K, L, N, O, and P of "1" is output from the point 14. In accordance with the output from the point 14, the pixels of interest are 6 pixels H, K, L, N, O, and P. In contrast to this, in the black input pattern calculated by the arithmetic unit 21, since the pixel H→1, K→1, L→0, N→1, O→0, and P→0, the arranger 16 outputs 6-bit data "110100". The arrangers 16 and 17 can be realized by multiplexers.

The 6-bit pixels of interest respectively for the black and white pixels extracted by the arrangers 16 and 17 are synchronized by system clocks CLK-O by latches 18 and 19. Vector quantization is then performed using the latched data as input vectors.

The vector quantization is performed such that reproduced vectors are prestored in a ROM 20 as a table in the same manner as in quantization of the white/black pattern using the ROM 11. More specifically, the extracted 6-bit data for the white and black pixels of interest synchronized by the latches 18 and 19 and the 5-bit white/black pattern code synchronized by the latch 13 are input to the address line of the ROM 20 to obtain a code Q2 as its output. The code Q2 is combined with the code Q1 of the white/black pattern to obtain the code Q of the reproduced pattern, as shown in FIG. 16.

As described above, image data having gray levels can be encoded by vector quantization for each block. Since a feature portion extracted from a pattern to be encoded is used as a basis of encoding, the data volume for encoding can be reduced, and encoding suited for the pattern feature can be executed at high speed.

Note that in this embodiment, a block size is 4×4, each pixel of the input pattern has four gray levels (2 bits), and 6 bits of pixels are respectively extracted for white and black pixels of interest. However, the present invention is not limited to these values, and optimal values can be set according to an actual system and other values can be changed in accordance therewith.

Figure 17:
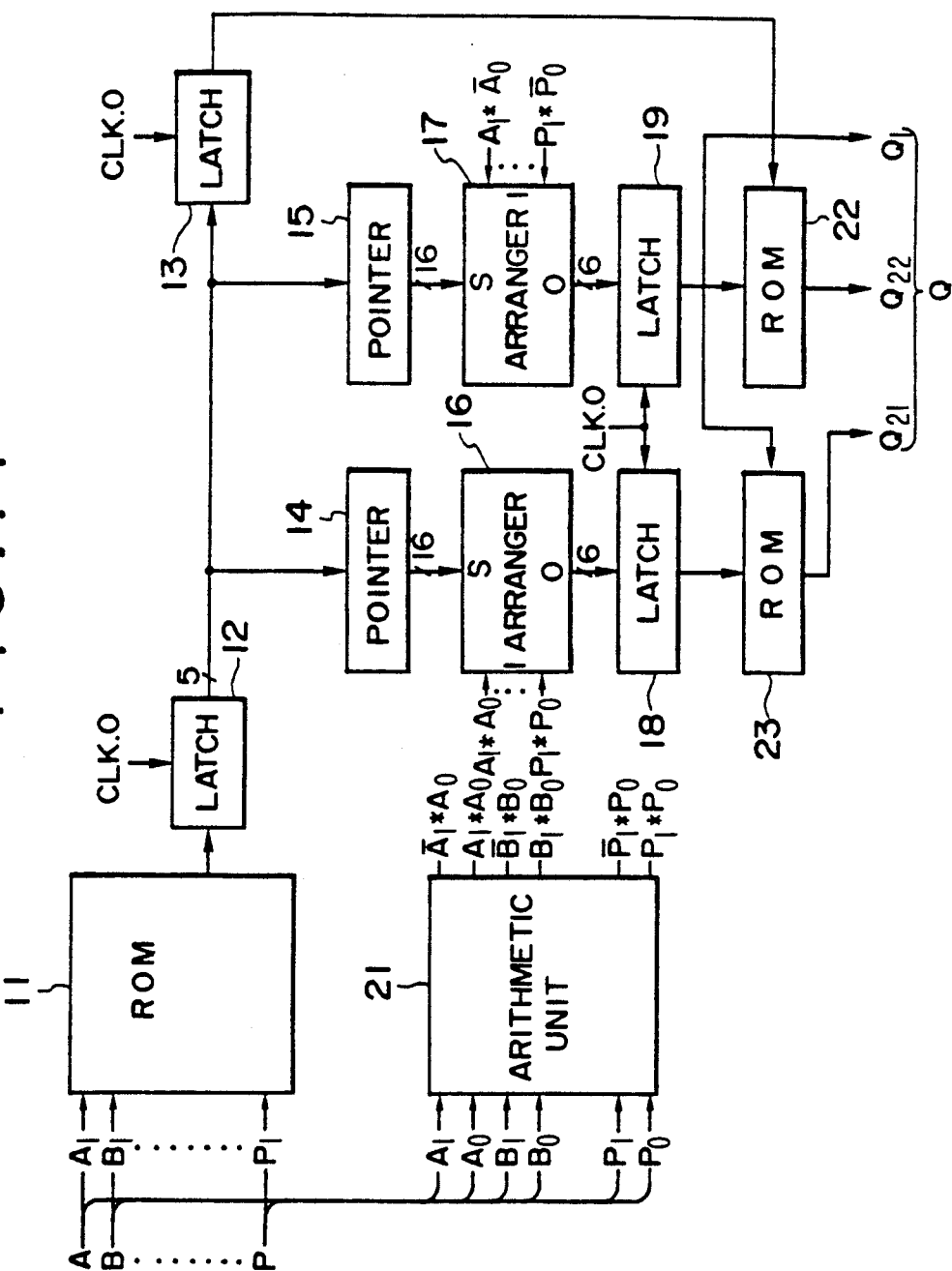
FIG. 17 is a block diagram showing another embodiment of a circuit configuration.

In the embodiment shown in FIG. 14, the white and black pixel of interest patterns are quantized using the single ROM 20 to obtain the code Q2. However, as shown in FIG. 17, two ROMs 22 and 23 can be arranged to separately quantize black and white pixels of interest, thereby obtaining two codes Q21 and Q22. The code Q of the reproduced pattern can be obtained using the codes Q21 and Q22, and the code Q1 of the white/black pattern. This method is effective when an input pattern includes a large number of gray levels and when there are a large number of pixels of interest. Note that other arrangements in FIG. 17 are the same as those in FIG. 14.

As described above, an input pattern of a digital image having gradation is binarized to white and black binary patterns using an appropriate threshold value, thus performing a first retrieval operation. Then, only predetermined pixels of interest are extracted in accordance with the white and black patterns to perform a second retrieval operation, thus realizing a vector quan-

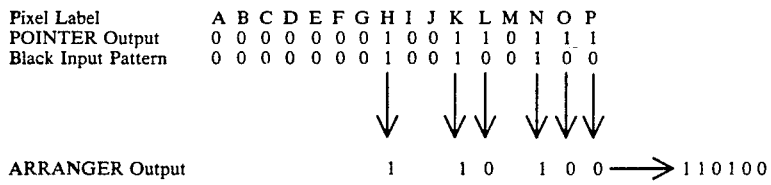

When the code of the white/black pattern SP shown in FIG. 13 is applied to the point 14, 16-bit data includtizing section which can perform real-time processing with a relatively simple hardware arrangement.

Since the first retrieval operation is performed while the input pattern is converted to white and black patterns, the apparatus is effective for an image including a large edge portion, such as a letter image. A binarized pattern of a block included in an image having a high contrast tends to be a specific pattern. If the reproduced pixel is subjected to subtraction to increase a compression ratio, an image quality can be maintained.

As described above, feature parameters, such as an average value and a standard deviation of pixel data in each block is calculated by the pre-processing section 43 for each block of a predetermined size with respect to image data having gradation obtained from a scanner, and the pixel data of each block is converted to data of small volume using these parameters. Furthermore, image data pre-processed by the pre-processing section 43 is subjected to vector quantization by the vector quantizing section 44, thereby achieving good gradation reproducibility of an image and encoding at a high compression ratio.

As in this embodiment, a coding apparatus need not always be constituted by combining the pre-processing section 43 and the vector quantizing section 44. If not so high a compression ratio is required, the encoding operation of image data can be executed only by the pre-processing section 43 or the vector quantizing section 44. The pre-processing section 43 of this embodiment can be combined with another quantizing section in place of the vector quantizing section 44 of this embodiment. Conversely, another pre-processing section in place of the pre-processing section 43 of this embodiment can be combined with the vector quantizing section 44 of this embodiment to constitute the coding apparatus.

Image Edition

As described above, digital image data is divided into blocks of a predetermined size, and an image pattern of each block is encoded in units of blocks. Thus, image processing, e.g., movement, rotation, and the like, can be relatively easily performed while the image remains encoded. Since an image for one frame is divided into a plurality of blocks and is encoded in units of blocks, processing of a specific block can be independently performed without influencing other blocks.

However, it is noted that in the case of rotation processing, since processing is simply performed in units of blocks, if these blocks are decoded in this state, a complete reproduced image cannot be obtained.

Figure 18:
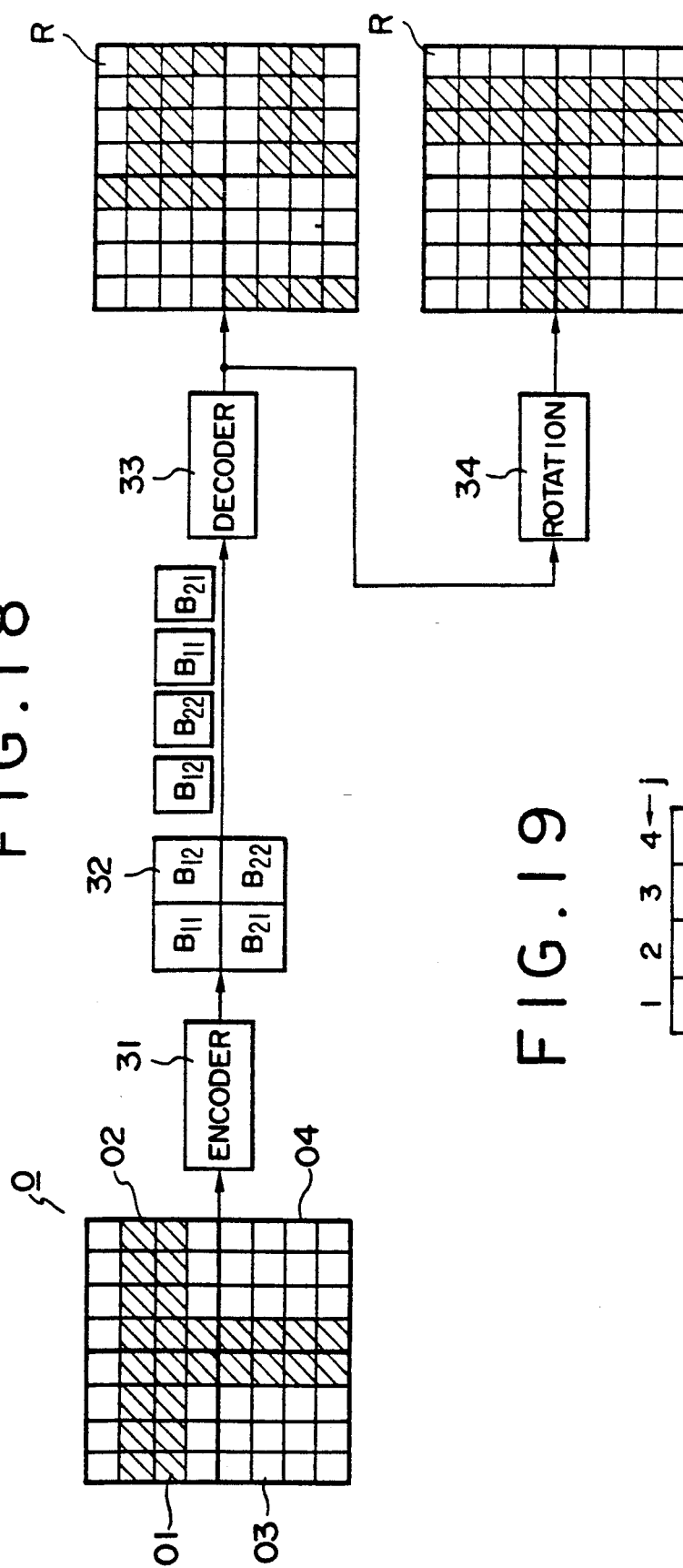
FIG. 18 is a chart for explaining image rotation processing.

This will be described with reference to FIG. 18. In FIG. 18, an original image O is encoded in units of blocks, and is rotated clockwise through 90°. The original image O is divided into four blocks O1 to O4 of 4×4 block size. The patterns of the blocks O1 to O4 are encoded by an encoder 31 to obtain patterns B11, B12, B21, and B22, and are then stored in a memory 32. In order to rotate an image clockwise through 90°, if a read access order from the memory 32 in the case of no rotation processing is B11, B12, B21, and B22, the read access is performed from the memory 32 in the order of B21, B11, B22, and B12, as shown in FIG. 18.

However, an image R1 reproduced by a decoder 33 using the data read out in this manner cannot correspond to an image which is obtained by rotating the original O clockwise through 90°. This is because although block positions are rotated, intrablock rotation is not performed. Therefore, when intrablock pixels are similarly rotated clockwise through 90°, a complete reproduced image R2 can be obtained. For this purpose, data decoded by the decoder 33 must be processed by a rotation unit 34 in accordance with its processing content to sort pixels in each block.

Figure 19:
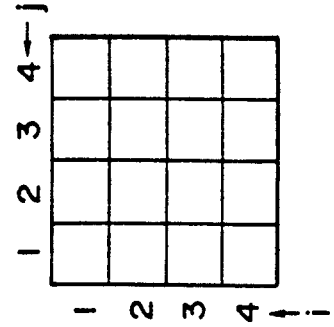
FIG. 19 is a view showing image blocks.

More specifically, as shown in FIG. 19, assuming that the block size corresponds to 4×4 pixels and each pixel position constituting a block is indicated by $x(i,j)$, each pixel constituting the block must be subjected to position conversion processing as follows.

| | |
|---|---|
| $x(i,j) \rightarrow x(j,5-i)$ | 90° rotation |
| $\rightarrow x(5-i,5-j)$ | 180° rotation |
| $\rightarrow x(5-j,i)$ | 270° rotation |
| $\rightarrow x(i,5-j)$ | mirror image |
| $\rightarrow x(j,i)$ | 90° rotation + mirror image |
| $\rightarrow x(5-i,j)$ | 180° rotation + mirror image |
| $\rightarrow x(5-j,5-i)$ | 270° rotation + mirror image |

The rotating direction is a clockwise direction, and a mirror image is formed about an i axis.

However, it is difficult to perform such processing in real time by hardware. Since the processing method must be changed in accordance with the processing content of each image, this problem becomes more serious.

Figure 20:
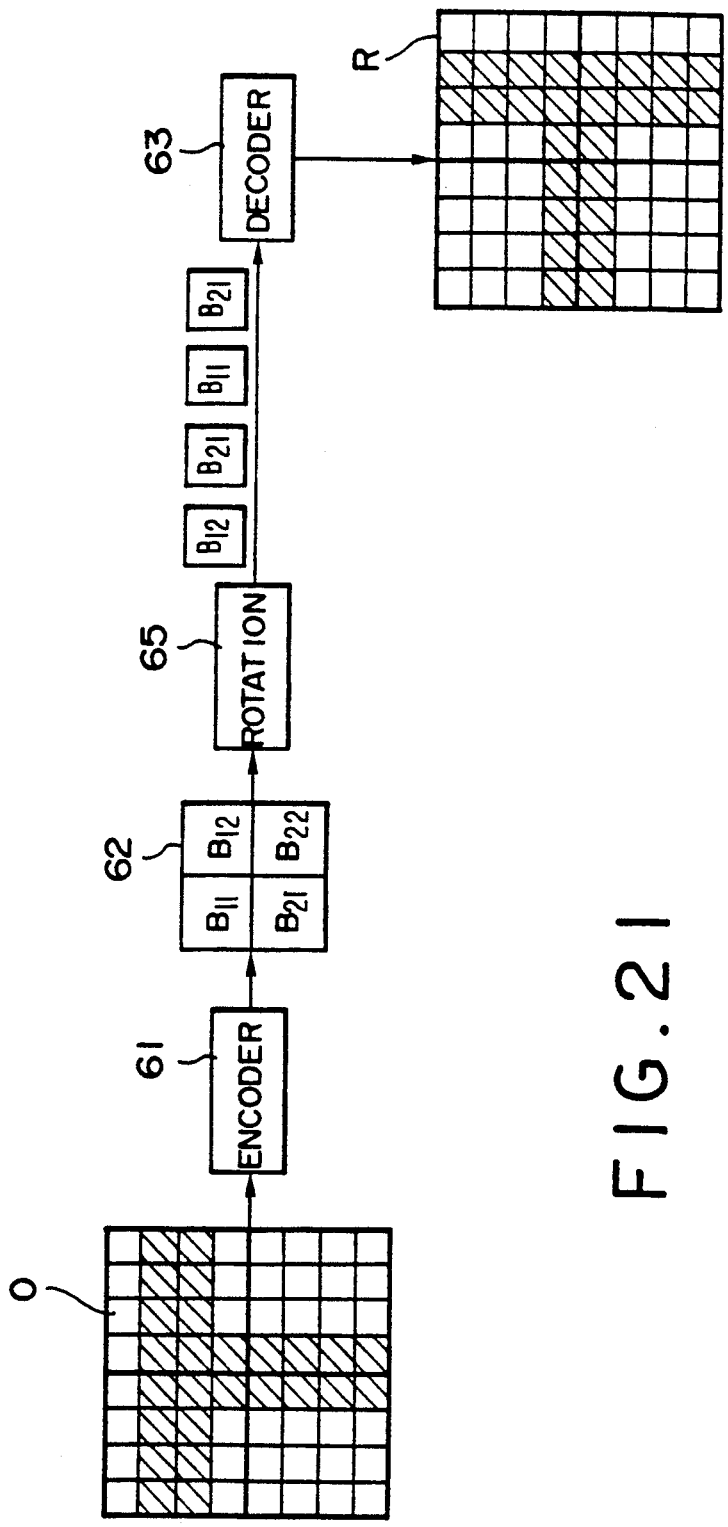
FIG. 20 is a chart for explaining the principle of rotation processing of the present invention.

A digital image coding method suitable for image rotation or symmetrical processing will be described hereinafter. More specifically, a block code is constituted by a code representing a pattern of a block and a code representing a rotation or symmetry mode of the pattern. With this code format, intrablock rotation or mirror image processing can be performed such that a code in a black itself is processed to be converted to a code of a rotated pattern. FIG. 20 is for explaining the principle of such a coding method.

The original image O is divided into blocks of a 4×4 size, and each block is encoded by an encoder 61 to a block code consisting of a pattern code representing a pattern structure of a block and a status code representing a rotation or symmetrical status of the pattern. The block code is stored in a memory 62.

If an image is rotated clockwise through 90°, respective block codes are sequentially read out from the memory 62 in the order of B21, B11, B22, and B12, in contrast to a normal read access order of B11, B12, B21, and B22 in the case of no rotation processing. A status code of each block code representing a rotation mode is processed by a rotation unit 65, so that the block code itself is converted to a block code of a rotated pattern which is obtained by rotating a pattern of an original block through 90°.

In this manner, when the rotated block code is decoded by a decoder 65 to reproduce an image, a 90°-rotated image R of an original 0 can be obtained, and separate processing for intrablock pixels can be omitted.

As a typical digital image block coding method, a coding method by means of vector quantization, as described above, is known. In the vector quantization, pixels in each block are processed as vector components, as described above. In the case of a 4×4 block, for example, a block of an input image is processed as a 16-dimensional vector. In the same 16-dimensional space, some vectors are registered as reproduced vectors, and the input vectors are mapped to reproduced vectors providing a minimum distortion. For example, if an input image is a binary image taking values of only "1" or "0", $2^{16}$ patterns may be present in a 4×4 block. However, an identical code is assigned to some different patterns. Therefore, if $2^8$ patterns are registered as patterns of a reproduced image, a data volume can be reduced from 16 bits to 8 bits, i.e., to ½. Note that if an allowable range of a distortion of a reproduced image is wider, $2^{16}$ patterns can be compressed to $2^5$ patterns.

Upon vector quantization, the pattern of a block is encoded as an address indicating a reproduced vector. In an actual hardware arrangement, the above-mentioned mapping can be relatively easily realized by a memory ROM storing a conversion table for encoding or decoding, as shown in FIG. 12 or 14. In this manner, the coding method by means of vector quantization can be regarded as a method for encoding a pattern structure of a block.

In the coding method as described above, the encoding operation is performed in such a manner that a pattern of a block is expressed by a pattern code representing a pattern structure and a status code representing a rotation or symmetry status of the pattern. When a reproduced pattern is registered, one of a plurality of patterns which can provide an identical pattern through rotation or symmetry processing is used as a basic pattern, and a pattern code common to that of the basic pattern is used to represent a plurality of patterns which can be obtained through rotation or symmetry processing of the basic pattern. The status code representing the rotation or symmetry mode is combined with the pattern code representing the basic pattern. Thus, when only the status code is changed, a pattern code, e.g., which is rotated through a desired angle, can be obtained.

Figure 21:
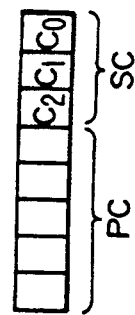
FIG. 21 is a format of a code used for encoding.

FIG. 21 shows a detailed example of the encoding method according to the above-mentioned principle, wherein an image of a 4×4 block is encoded by, e.g., 8 bits. A pattern code PC (the code Q shown in FIG. 16 is used) representing an image pattern is assigned to upper 5 bits of an 8-bit block code, and a status code SC representing a rotation or symmetry mode is assigned to lower 3 bits thereof. In this example, $2^{16}$ patterns are compressed to $2^5$ pattern codes. However, the number of bits of the pattern code PC varies in accordance with a compression ratio.

Figure 22:
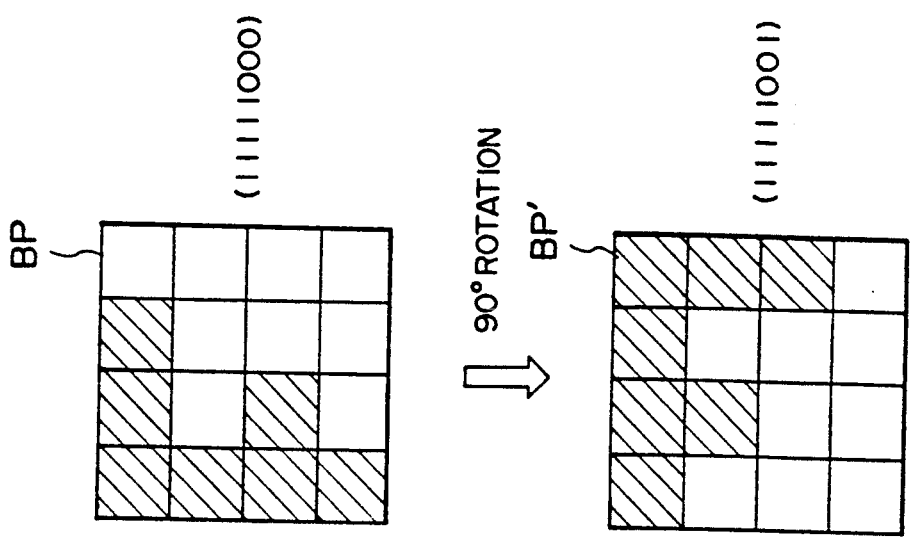
FIG. 22 is a chart for explaining image processing.

FIG. 22 shows an operation when an image BP which is encoded by the block code shown in FIG. 21 is rotated clockwise through 90°. Assume that the pattern code PC corresponding to the image BP is "111111", and the image BP is registered as a basic pattern. As described above, if the status code representing the basic pattern is "000", the block code of the basic pattern is "111111000". For a pattern obtained by rotating the basic pattern through 90°, if 90° rotation of the status code is represented by "001", a block code representing a pattern $BP^1$ after the rotation processing is "11111001".

When a coding operation of a code representing the rotation or symmetry mode is performed as follows, the status code SC itself can be used as a reproduced vector. For this purpose, the status code SC is regarded not only as a code representing an absolute rotation or symmetry state with respect to the basic pattern but also as a code representing a rotation or symmetry state relative thereto. Thus, whatever the state the status code SC is in with respect to the basic pattern, identical processing is performed to produce an identical relative state before and after processing.

Figure 23:
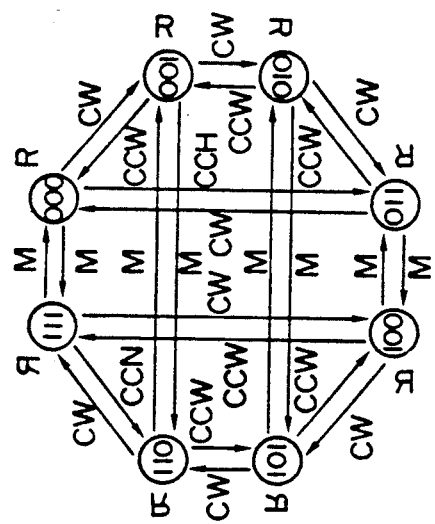
FIG. 23 is a status transition chart.

The examples of the status code SC are shown below. FIG. 23 is a status transition diagram of an image corresponding the status code SC.

| Basic pattern | 000 |
|---|---|
| 90° rotation | 001 |
| 180° rotation | 010 |
| 270° rotation | 011 |
| Mirror image | 111 |
| 90° rotation + mirror image | 110 |
| 180° rotation + mirror image | 101 |
| 270° rotation + mirror image | 100 |

More specifically, the status code SC representing the basic pattern is "000", and eight statuses are represented by 3-bit codes, as described above. As shown in the status transition diagram of FIG. 23, a predetermined relation is provided among eight rotation symmetry statuses.

When "1" is added to the lower 2 bits of the 3-bit status code SC while the MSB is left unchanged (processing CW), a pattern code which corresponds to the pattern rotated to the right (clockwise) through 90° can be obtained. In contrast to this, when "1" is subtracted from the lower 2 bits while the MSB is left unchanged (processing CCW), a pattern can be rotated to the left (counterclockwise) through 90°. Furthermore, when the respective bits of the 3-bit status code SC are inversed (if "0", "1"; if "1", "0" (processing M)), a mirror image of this pattern can be obtained.

With this coding, during encoding processing, such as vector quantization, when input vectors are mapped to reproduced vectors, they can be processed simply as identical reproduced vectors without differentiating basic pattern or a pattern obtained through given rotation processing. It should be noted that a pattern obtained through rotation or symmetry processing of a given basic pattern must not be again used as a basic pattern.

Figure 24:
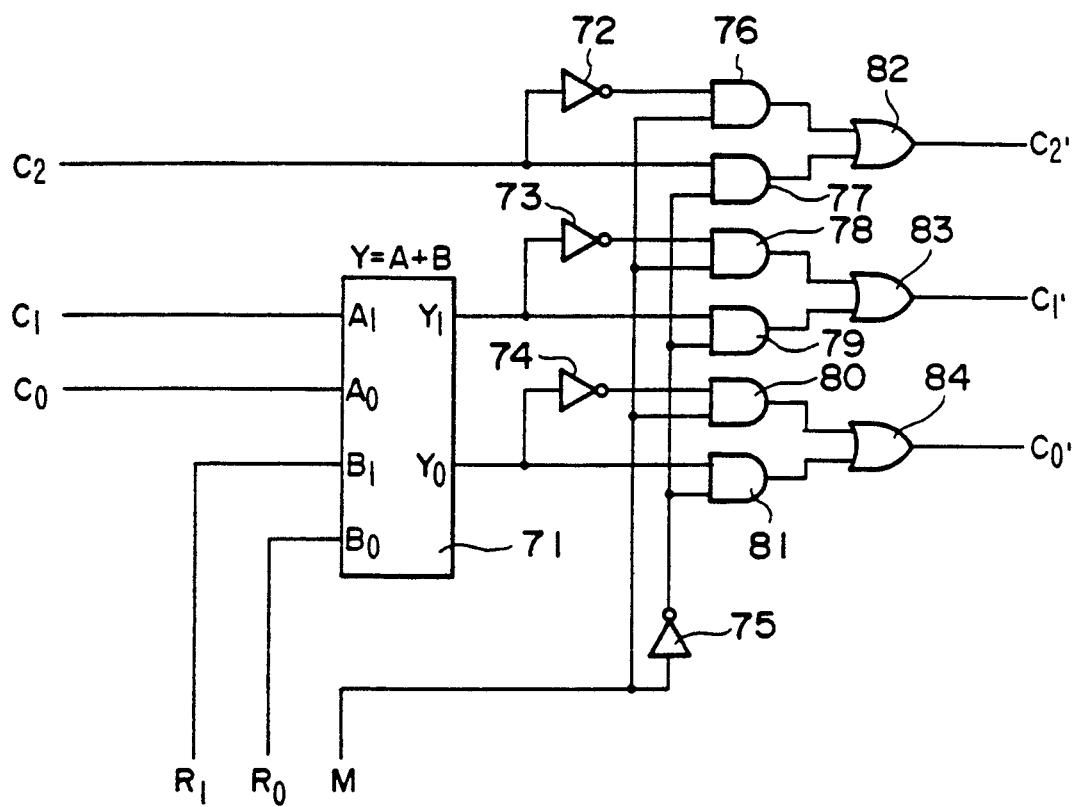
FIG. 24 is a circuit diagram showing the arrangement of a rotation unit.

FIG. 24 is a detailed arrangement of the rotation unit 65 shown in FIG. 20 in order to realize the processing of the status code SC. In this case, bit data C2, C1, and C0 constitutes the 3-bit status code shown in FIG. 22 representing the rotation or symmetry mode.

In FIG. 24, signals R1 and R0 indicate pattern rotation angles, and a signal M indicates the presence/absence of mirror image processing. For example, the signal M is produced upon reception of an image processing instruction from an operator using an input device, such as a keyboard or a digitizer. When the signal M is "1", this indicates inversion of the 3-bit status code SC, i.e., the mirror image processing. The signals R1 and R0 are combined to indicate the following processing:

| R1 | R0 | Processing Content |
|---|---|---|
| 0 | 1 | 90° clockwise rotation (270° counterclockwise rotation) |
| 1 | 0 | 180° rotation |
| 1 | 1 | 270° clockwise rotation (90° counterclockwise rotation) |
| 0 | 0 | No processing |

A 2-bit adder 71 rotates the lower two bits (C1, C0) of the input status code in accordance with the signals R1 and R0. More specifically, the adder 71 performs an addition of C1C0+R1R0, and outputs the lower 2 bits of the sum as Y1Y0.

The circuit of FIG. 24 also includes inverters 72 to 75 for inverting levels of input signals, AND gates 76 to 81, and OR gates 82 to 84. The upper 1 bit C2 of the status code SC and two outputs Y1 and Y0 from the adder 71 are inverted by the inverters 72 to 74, respectively, and are input to the AND gates 76, 78, and 80, respectively. The data C2, Y1, and Y0 are also input to the AND gates 77, 79, and 81.

The AND gates, 76, 78, and 80 receive the signal M, and the AND gates 77, 79, and 81 receive an inverted signal of the signal M through the inverter 75.

Therefore, when the signal M is "0", the inputs to the AND gates 77, 79, and 81, i.e., data C2, Y1, and Y0 are output as data C'2, C'1, and C'0 through the OR gates 82, 83, and 84, respectively. When the signal M is "1", inverted values of the inputs to the AND gates 76, 78, and 80, i.e., data C2, Y1, and Y0, are output as data C'2, C'1, and C'0 through the OR gates 82, 83, and 84, respectively. In this manner, the status code SC rotated by the adder 71 is subjected to the mirror image processing.

As described above, the status code SC is converted by the rotation unit 65 shown in FIG. 24 in accordance with a processing instruction. Note that a pattern code in a block code is subjected to no processing by the rotation unit 65.

The block code including the processed status code SC and the pattern code PC is decoded to an image pattern by the decoder shown in FIG. 20 using a retrieval technique of the conversion table as described previously.

In the above embodiments, a block to be encoded has a size of 4×4 pixels. However, the present invention is not limited to this. A pixel to be encoded is also not limited to white/black binary data but can have gradation. The number of bits of a pattern code is not limited to 5 bits, and that of a status code is not limited to 3 bits. The number of bits can be changed in accordance with a compression ratio or processing contents.

As described above, when a pattern of a block is encoded by, e.g., vector quantization, since a block code is constituted by a code representing a pattern and a code representing a rotation or symmetry status of the pattern, high-speed processing for intrablock pixels can be realized by a simple operation upon rotation or symmetry processing of an encoded block.

In a coding method which causes distortion in a reproduced image like in vector quantization, since a rotated or symmetric block is always present, no difference in image quality is caused after any rotation or symmetry processing. For example, a 90°-rotated image can have the same image quality as that of a 180°-rotated image, resulting in great practical advantages.

The present invention has been described with reference to the preferred embodiments. However, the present invention is not limited to these embodiment, and various changes and modifications may be made within the spirit and scope of the invention.

We claim:

1. An image data coding method comprising the steps of:
    dividing an image into a plurality of blocks, each consisting of a plurality of pixels;
    encoding an image pattern of each of the blocks, a plurality of image patterns, which have been obtained by means of rotation-processing an identical image pattern, being so encoded into a common pattern code; and
    adding a status code indicating a rotation angle of the image pattern of each of the blocks to the common pattern code obtained in said encoding step.

2. An image data coding method comprising the steps of:
    dividing an image into a plurality of blocks, each consisting of a plurality of pixels;
    encoding an image pattern of each of the blocks, a basic image pattern and a mirror image pattern of the basic image pattern being so encoded into a common pattern code; and
    adding a status code providing identification of the basic image pattern and the mirror image pattern to the common pattern code obtained in said encoding step.

3. A method according to claim 1 or 2, wherein, in said encoding step, the image pattern of each of the blocks is encoded by vector quantization.

4. A method according to claim 1 or 2, further comprising the step of processing the status code to modify the image pattern of each of the blocks.

5. An image data coding apparatus comprising:
    means for dividing an image into a plurality of blocks, each consisting of a plurality of pixels;
    means for encoding an image pattern of each of the blocks, said encoding means so encoding a plurality of image patterns, which are obtained by means of rotation-processing an identical image pattern, into a common pattern code; and
    means for adding a status code indicating a rotation angle of the image pattern of each of the blocks to the common pattern code obtained by said encoding means.

6. An image data coding apparatus comprising:
    means for dividing an image into a plurality of blocks, each consisting of a plurality of pixels;
    means for encoding an image pattern of each of the blocks, said encoding means so encoding a basic image pattern and a mirror image pattern of the basic image pattern into a common pattern code; and
    means for adding a status code providing identification of the basic image pattern and the mirror image pattern to the common pattern code obtained by said encoding means.

7. An apparatus according to claim 5 or 6, wherein said encoding means encodes the image pattern of each of the blocks by means of vector quantization.

8. An apparatus according to claim 5 or 6, further comprising means for processing the status code so as to modify the image pattern of each of the blocks.

* * * * *

UNITED STATES PATENT AND TRADEMARK OFFICE
CERTIFICATE OF CORRECTION

PATENT NO. : 5,065,446
DATED : November 12, 1991
INVENTOR(S) : YOSHIYUKI SUZUKI, ET AL.

It is certified that error appears in the above-identified patent and that said Letters Patent is hereby corrected as shown below:

Title page,
IN [56] REFERENCES CITED

U.S. PATENT DOCUMENTS, "Watori et al." should read --Hatori et al. and "Tzon" should read --Tzou--.

SHEET 1 OF 13

FIG. 2, "PER-PROCESSING" should read --PRE-PROCESSING--.

SHEET 11 OF 13

FIG. 20, " $B_{12}$ $B_{21}$ $B_{11}$ $B_{21}$ " should read -- $B_{12}$ $B_{22}$ $B_{11}$ $B_{21}$ --.

COLUMN 1

Line 31, "often" should be deleted.

COLUMN 3

Line 14, "(Divider Section)" should be heading --Divider Section--.

COLUMN 5

Line 26, "subtractor 3," should read --subtracter 3,--.
    Line 41, "subtractor 3" should read --subtracter 3--.

UNITED STATES PATENT AND TRADEMARK OFFICE
CERTIFICATE OF CORRECTION

PATENT NO.  : 5,065,446

DATED       : November 12, 1991

INVENTOR(S) : YOSHIYUKI SUZUKI, ET AL.

It is certified that error appears in the above-identified patent and that said Letters Patent is hereby corrected as shown below:

COLUMN 6

Line 34, "state" should read --state of--.
Line 47, "respect" should read --respect to--.
Line 52, "pre-processing section 44," should read
       --pre-processing section 43,--.
Line 60, "x=" should read -- $\vec{x}$ =--.
Line 61, "vector yi" should read --vector $\vec{y}i$--.

COLUMN 7

Line 6, "vector yi" should read --vector $\vec{y}i$--.
Line 8, "vector x" should read --vector $\vec{x}$ --.
Line 19, "x and yi." should read -- $\vec{x}$ and $\vec{y}i$.--.
Line 26, "vector x" should read --vector $\vec{x}$ --.
Line 30, "vector y." should read --vector $\vec{y}$.--.

COLUMN 9

Line 11, "vecto's." should read --vectors.--.
Line 32, "points 14 and 15" should read
       --pointers 14 and 15--.
Line 68, "point 14," should read --pointer 14,--.

COLUMN 10

Line 2, "point 14." should read --pointer 14.--.
Line 3, "point 14," should read --pointer 14.--.

COLUMN 11

Line 56, "block size." should read --pixel size.--.

UNITED STATES PATENT AND TRADEMARK OFFICE
CERTIFICATE OF CORRECTION

PATENT NO. : 5,065,446
DATED : November 12, 1991
INVENTOR(S) : YOSHIYUKI SUZUKI, ET AL.

It is certified that error appears in the above-identified patent and that said Letters Patent is hereby corrected as shown below:

COLUMN 12

Line 35, "black" should read --block--.

COLUMN 15

Line 58, "embodiment," should read --embodiments,--.

Signed and Sealed this

Twentieth Day of April, 1993

Attest:

MICHAEL K. KIRK

*Attesting Officer*     Acting Commissioner of Patents and Trademarks